US009556575B2

(12) United States Patent
Moran

(10) Patent No.: US 9,556,575 B2
(45) Date of Patent: Jan. 31, 2017

(54) ADJUSTABLE SELF-LEVELING BOAT BUMPER SYSTEM

(71) Applicant: Michael Patrick Moran, Fort Myers Beach, FL (US)

(72) Inventor: Michael Patrick Moran, Fort Myers Beach, FL (US)

( * ) Notice: Subject to any disclaimer, the term of this patent is extended or adjusted under 35 U.S.C. 154(b) by 0 days.

(21) Appl. No.: 14/549,987

(22) Filed: Nov. 21, 2014

(65) Prior Publication Data
US 2015/0252545 A1 Sep. 10, 2015

Related U.S. Application Data

(63) Continuation-in-part of application No. 14/269,479, filed on May 5, 2014, now Pat. No. 9,302,750.

(60) Provisional application No. 62/009,142, filed on Jun. 6, 2014, provisional application No. 61/950,477, filed on Mar. 10, 2014, provisional application No. 62/019,013, filed on Jun. 30, 2014.

(51) Int. Cl.
E02B 3/26 (2006.01)
(52) U.S. Cl.
CPC ........................................ *E02B 3/26* (2013.01)
(58) Field of Classification Search
CPC ........................................................ E02B 3/026
USPC ........................................................ 405/114
See application file for complete search history.

(56) References Cited

U.S. PATENT DOCUMENTS

| 3,975,916 | A | 8/1976 | Watson |
|---|---|---|---|
| 4,124,986 | A | 11/1978 | Postma |
| 4,584,958 | A | 4/1986 | Green |
| D297,627 | S | 9/1988 | Patton |
| 4,900,192 | A | 2/1990 | Wood |
| 5,018,471 | A | 5/1991 | Stevens |
| 5,497,723 | A | 3/1996 | Chase |
| D378,508 | S | 3/1997 | Kinkead |
| 5,697,316 | A | 12/1997 | Kinkead |
| 5,701,837 | A | 12/1997 | Harvey |
| 5,727,493 | A | 3/1998 | Pierce |
| 5,762,016 | A | 6/1998 | Parsons |
| D439,038 | S | 3/2001 | Hinkle |
| 6,327,989 | B1 | 12/2001 | Beach |
| 6,349,661 | B1 | 2/2002 | Dusek |
| D456,323 | S | 4/2002 | Dietz |
| 6,783,303 | B2 | 8/2004 | Snyder |

(Continued)

OTHER PUBLICATIONS

Unknown Author, Boat Fenders—How-To Guides, Feb 16, 2014 or earlier, http://www.savvyboater.com/boat-fenders-resources.aspx.

(Continued)

*Primary Examiner* — Tara M. Pinnock
(74) *Attorney, Agent, or Firm* — George F. Wallace

(57) ABSTRACT

An adjustable self-leveling boat bumper system attaches to a nautical structure associated with a body of water, and includes a longitudinal main guide, a longitudinal adjustment guide connected to a float element, a receiver, a boat bumper connected to the receiver, and an adjustment lock. The main and adjustment guides are oriented perpendicularly to a water surface. The receiver includes a main guide aperture and an adjustment aperture. The main and adjustment guides are moveably engaged with the main guide and adjustment apertures, respectively. The lock determines whether the adjustment guide is moveable. The float element provides a buoyancy force that maintains the receiver and float at a particular position along the main guide relative to the tide level of a body of water.

22 Claims, 5 Drawing Sheets

(56) References Cited

U.S. PATENT DOCUMENTS

| | | |
|---|---|---|
| 7,237,502 B1 | 7/2007 | Atkinson |
| D578,464 S | 10/2008 | Sheedy et al. |
| 7,717,642 B2 | 5/2010 | Patten |
| D657,300 S | 4/2012 | Wright |
| 8,156,883 B2 | 4/2012 | Sheedy et al. |
| 2006/0130727 A1 | 6/2006 | Eischeid |
| 2007/0094816 A1 | 5/2007 | Patten |
| 2010/0107953 A1 | 5/2010 | Selway |

OTHER PUBLICATIONS

Unknown Author, Anchor Stern or Bow Fender, Jun. 19, 2014 or earlier, http://www.sheridanmarine.com/.

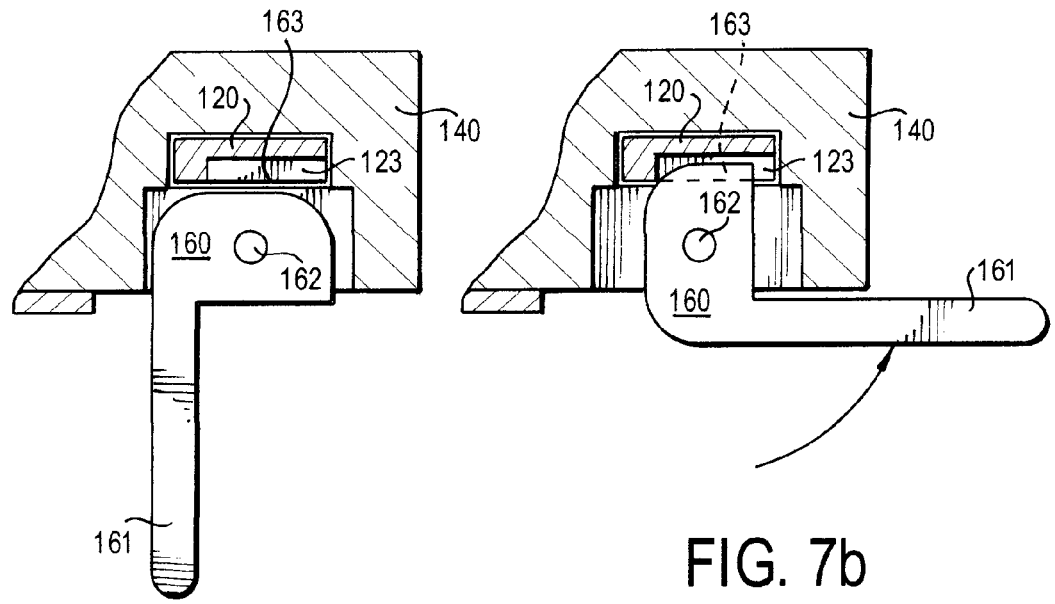
FIG. 7a
FIG. 7b
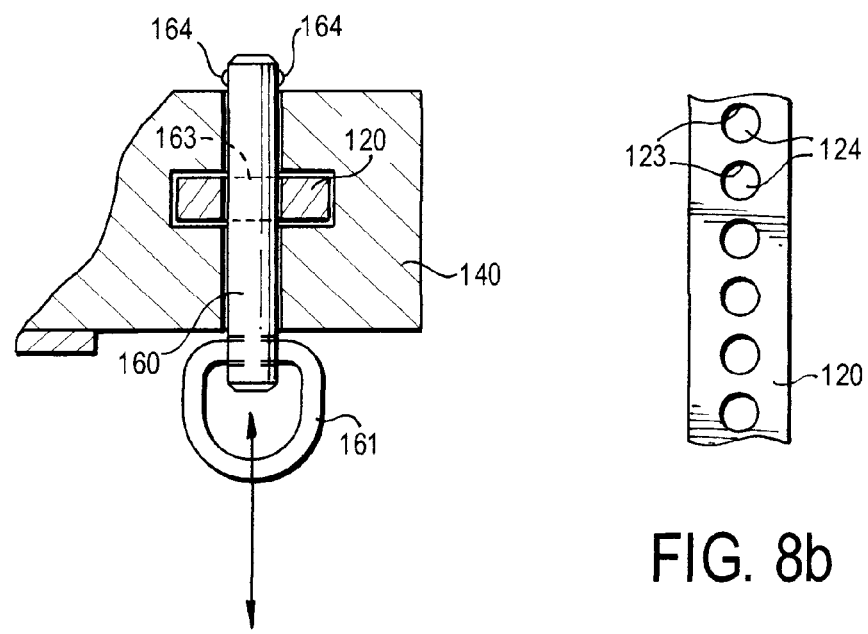
FIG. 8a
FIG. 8b

ADJUSTABLE SELF-LEVELING BOAT BUMPER SYSTEM

CROSS-REFERENCE TO RELATED DOCUMENTS

This document is related to, incorporates by reference in its entirety, and claims the priority benefit of the following U.S. Provisional Patent Application Ser. No. 61/950,477, entitled "Boat Bumper System," and filed on Mar. 10, 2014 by Michael Patrick Moran, Ser. No. 62/009,142, entitled "Boat Bumper System," and filed on Jun. 6, 2014 by Michael Patrick Moran, and Ser. No. 62/019,013, entitled "Boat Bumper System," and filed on Jun. 30, 2014 by Michael Patrick Moran; and U.S. patent application Ser. No. 14/269,479, entitled "Self-Leveling Boat Bumper System," and filed on May 5, 2014 by Michael Patrick Moran.

FIELD OF THE INVENTION

The present invention relates to boat bumpers and nautical structures.

BACKGROUND OF THE INVENTION

Boat bumpers are used in conjunction with watercrafts, which can include any type of water-based vessel, such as a boat, ship, personal watercraft, etc. (hereinafter, collectively "vessel" or "boat"). When a boat is attached or fixed to a nautical structure (such as a dock, seawall, another boat, quay wall, etc.), one or more bumpers can be disposed between one or more sides of the boat and the structure to protect such one or more sides and/or the structure from damage arising from the boat contacting the structure by absorbing at least a portion of any kinetic energy arising therebetween. Bumpers have been manufactured from rubbers, elastomers, and plastics.

SUMMARY OF THE INVENTION

It is an object of the present invention to provide an adjustable self-leveling boat bumper system that can be attached to a nautical structure at least partially over or adjacent to a body of water having a low tide and a high tide.

In an exemplary embodiment of the present invention, such a system can include a longitudinal main guide; a longitudinal adjustment guide; at least one receiver; a boat bumper; and an adjustment lock.

In exemplary aspects, a longitudinal main guide can be fixed to the nautical structure and oriented perpendicular to a surface of the body of water. A longitudinal adjustment guide can also be oriented perpendicular to the surface, and can have a first end extending upwardly and a second end attached to a float element.

In another exemplary aspect, the at least one receiver can have a guide aperture and an adjustment aperture. The guide aperture can have the main guide disposed therethrough with the at least one receiver being moveably engaged with said main guide; and the adjustment aperture can have the adjustment guide disposed therethrough with the adjustment guide being engaged with the at least one receiver.

In a further exemplary aspect, a boat bumper can be connected to the at least one receiver and positioned to face away from the nautical structure.

In yet another exemplary aspect, the adjustment lock can be adjacent to the adjustment guide and can be moveable between a locked position, in which at least a portion of the lock contacts the adjustment guide to render the adjustment guide and the at least one receiver immovably engaged with each other, and an unlocked position in which the portion does not contact the adjustment guide to render the adjustment guide and the at least one receiver movably engaged with each other.

In still further exemplary aspects, the at least one receiver can be moveable between a low position, in which the boat bumper is at a first bumper position, and a high position, in which the boat bumper is at a second bumper position above the first position; and when floating within the body of water, the float element can provide a buoyancy force that maintains the boat bumper in a static position along a range of motion defined by the first and second bumper positions.

In another exemplary embodiment of the present invention, such a system can optionally include one or more additional receivers, which can be positioned above and/or below the at least one receiver, with each additional receiver having a second aperture with the main guide disposed therethrough such that an additional receiver can be moveably engaged with the main guide. Further, an additional receiver can be provided as a separate component or can be integral with a float element. Moreover, such a system can further include a receiver connector attached to the at least one receiver and a second receiver, with the boat bumper being attached to the receiver connector.

In yet another exemplary embodiment of the present invention, such a system can optionally include a longitudinal lateral guide fixed to the nautical structure and oriented perpendicular to the surface, with an at least one receiver further including a lateral guide aperture having the longitudinal lateral guide disposed therethrough with the at least one receiver being moveably engaged with the longitudinal lateral guide.

Any combination of the following additional and/or optional exemplary aspects can apply to any embodiment of the present invention:
- a main guide can include upper and lower portions attached to the nautical structure;
- a lock can include a handle moveable between a first lock position corresponding to the locked position, and a second lock position corresponding to the unlocked position;
- with a lock in the locked position, the at least a portion of the lock can contact the adjustment guide to create static friction therebetween;
- with a lock in the locked position, the at least a portion of the lock can be below at least a part of the adjustment guide;
- a bumper can include a lateral support abutting at least one of a plurality of laterally-related portions of the nautical structure;
- at least a portion of the main guide can have a cylindrical shape; and
- at least a portion of the adjustment guide can have a parallelepiped shape.

BRIEF DESCRIPTION OF THE DRAWINGS

FIG. 7a illustrates another exemplary lock in an unlocked position.

FIG. 7b illustrates another exemplary lock in a locked position.

FIG. 8a illustrates another exemplary lock in a locked position.

FIG. 8b illustrates an exemplary adjustment guide for use with a pin-based lock.

DETAILED DESCRIPTION

It is an object of the present invention to provide an adjustable self-leveling boat bumper system having a plurality of embodiments, which are described, and are to be broadly interpreted, via the disclosure herein.

It should be noted that this disclosure includes a plurality of embodiments each having a plurality of elements and/or aspects, and such elements and/or aspects need not necessarily be interpreted as being conjunctively required by one or more embodiments of the present invention. In particular, all combinations of elements and/or aspects can enable a separate embodiment of a patentable invention, which may be claimed with particularity in this or any future filed Patent Applications. Moreover, such elements and/or aspects disclosed herein, whether expressly or implicitly, are to be construed strictly as illustrative and enabling, and not necessarily limiting.

Further, to the extent the same element and/or aspect is defined differently anywhere within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

The present invention provides an adjustable self-leveling boat bumper system that can statically position a boat bumper along a vertical range of motion as the level of a body of water changes between low and high tides. Accordingly, such a system can advantageously position a boat bumper in an automated manner as a tide changes to desirably position the bumper between a nautical vessel (herein, "vessel" or "boat") and a nautical structure. Thus, a vessel can be tied or attached to such a nautical structure and/or any portion of the system (e.g., via the provisioning of a cleat), and during a change in tide level, the vertical position of an included boat bumper can be automatically changed to maintain its desired function. Further, the present invention can allow such a system to be adjusted to accommodate differently sized vessels.

Figure 2:
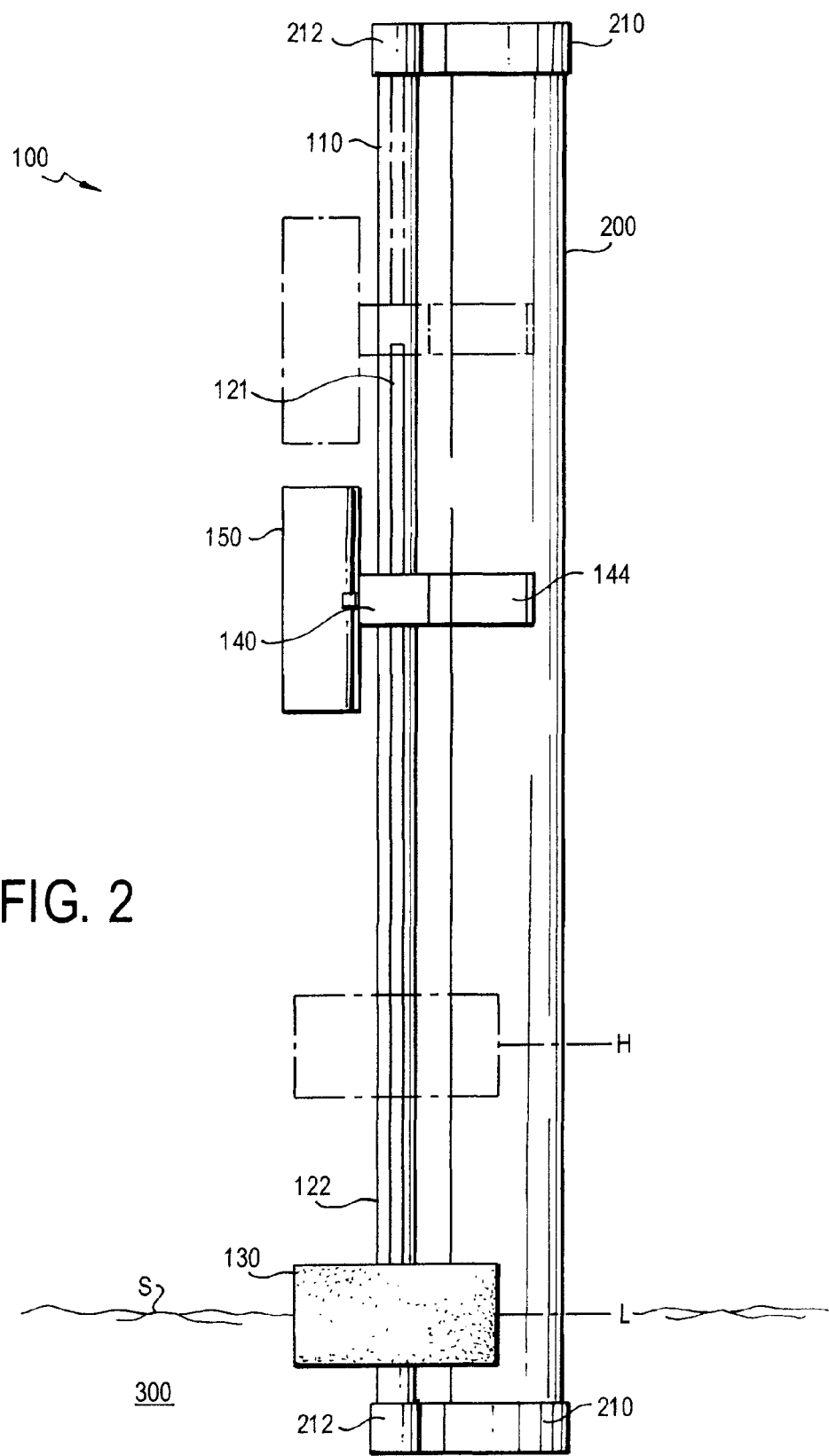
FIG. 2 illustrates an exemplary range of motion provided by an adjustable self-leveling boat bumper system.

In an exemplary environment of the present invention, a self-leveling boat bumper system can be attached to a nautical structure that is at least partially over a body of water having a low tide L and a high tide H (See FIG. 2). According to the present invention, a nautical structure can include any type of structure associated with a body of water, such as, for example and not in limitation, a boat, ship, personal watercraft, or any portion of a dock, piling, seawall, boat, quay wall, or any other structure that can be, at least in part, over a body of water.

Figure 1:
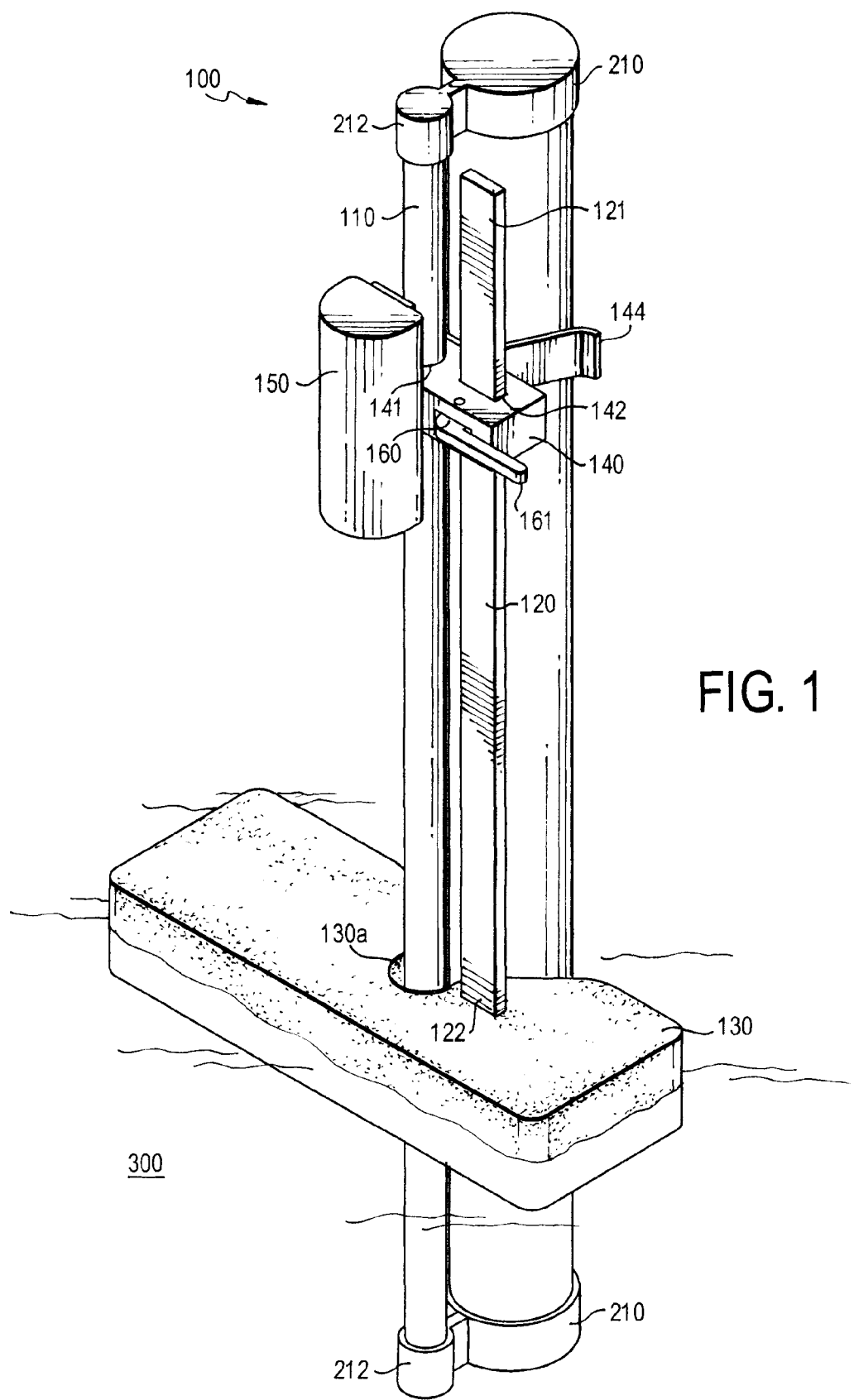
FIG. 1 illustrates an exemplary adjustable self-leveling boat bumper system having a longitudinal main guide, a longitudinal adjustment guide connected to a float, a receiver, a boat bumper, and an adjustment lock.

FIG. 1 illustrates an exemplary embodiment of the present invention, in which an adjustable self-leveling boat bumper system 100 can be attached to a nautical structure, which in this example can be a piling 200. As illustratively shown, system 100 can include a longitudinal main guide 110; a longitudinal adjustment guide 120 connected to a float 130; a receiver 140; a boat bumper 150; and an adjustment lock 160.

The following summarizes operation of the present invention: when system 100 is attached to nautical structure 200 and float 130 is within a body of water 300, the float provides a buoyancy force that acts upwardly upon adjustment guide 120 and receiver 140, which maintains bumper 150 in a static position relative to the tide level of the body of water. Notably, as discussed infra, such operation arises with adjustment lock 160 in a locked position.

Figure 5:
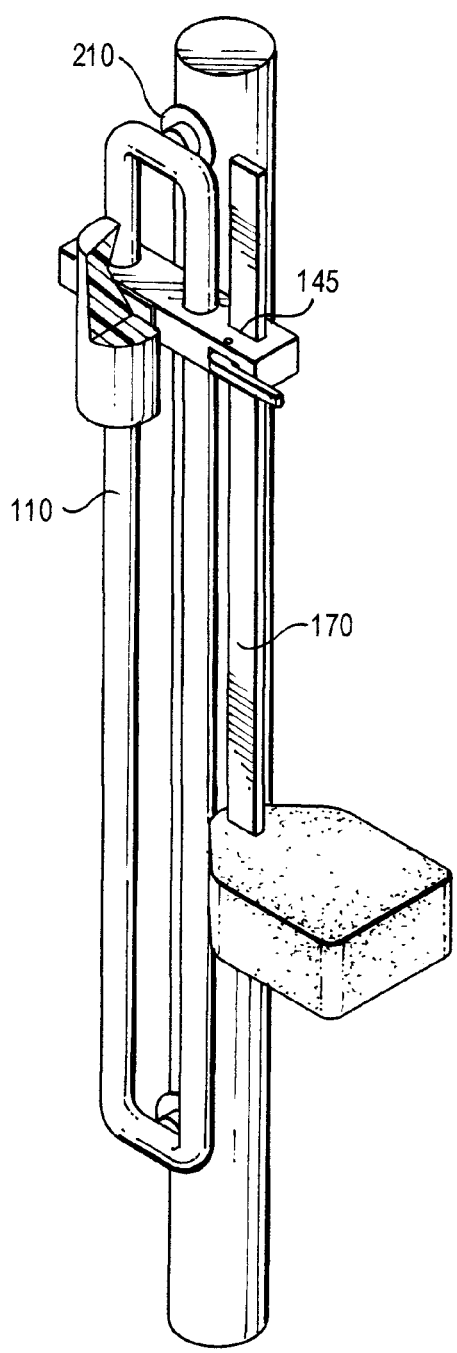
FIG. 5 illustrates another exemplary system having an exemplary lateral guide.

In an exemplary aspect of the present invention, main guide 110 can be attached to nautical structure 200 via one or more mounts 210, which as illustrated, can attach to the nautical structure and include at least one hollowed housing 212 in which ends of the main guide 110 can be disposed. Notably, mount 210 is not limited to the specific structure illustrated, and therefore, can be provided as any one or more known or apparent desired structures, insofar as the same is functionally consistent with the present invention. For example and not in limitation, mount 210 can be provided as any one or more of a clamp, cap, band, strap, frame, screw, bolt, nut, etc., in which the mount can fix main guide 110 to nautical structure 200. For example and not in limitation, as illustrated in FIG. 5, mount 210 can be alternatively configured to horizontally mount to nautical structure 200 and engage main guide 110 (and optionally, lateral guide 170, discussed infra) in a horizontal manner. It should also be noted that mount 210 can be configured to position main guide 110 at any desired lateral distance from nautical structure 200 to provide a desired operational clearance between system 100 and the nautical structure.

As illustrated in FIG. 2, upon fixation to nautical structure 200, main guide 110 can be oriented perpendicular to a surface S of body of water 300 to define a vertical range of motion of receiver 140 and bumper 150 along the main guide. As also illustrated, longitudinal adjustment guide 120 can also be oriented perpendicular to surface S and can have a first end 121 extending upwardly and a second end 122 attached to float element 130. Notably, attachment of float element 130 to second end 122 can be effectuated with any one or more structures desired, such as a clamp, brace, screw, bolt, nut, adhesive, wire, frame, another receiver, etc. Further, such attachment can be direct or indirect insofar as desired and functionally compatible.

In another exemplary aspect of the present invention, main guide 110 and adjustment guide 120 can be formed from any one or more desired materials, such as a metal, alloy, plastic, rubber, or any other naturally-occurring or man-made material(s) that are functionally consistent with the present invention. Further, main guide 110 and adjustment guide 120 are illustratively shown as having cylindrical and parallelepiped shapes, respectively; however, the same can be provided in any alternative shape or shapes to the extent desired and functionally compatible with the present invention, including any geometric shape or shapes.

In still another exemplary aspect of the present invention, float element 130 can be provided, via material selection and/or construction (e.g., material density, at least one hollowed portion, closed-cell foam, etc.), so as to be buoyant in body of water 300, in that it provides a buoyancy force sufficient to maintain bumper 150 in a static position. Accordingly, at a particular tide level, bumper 150, via connection to float element 130, can be statically positioned relative to the tide level, which can be a low tide L, a high tide H, and levels therebetween. Moreover, float element 130 can be provided in any known or apparent configuration that is functionally compatible with the present invention. Further, as the tide level changes, moveable engagement of receiver 140 with main guide 110 allows the receiver to vertically move along the main guide, which can position boat bumper 150 relative to such change.

In a further exemplary aspect of the present invention, float 130 can be provided in any desired shape that is functionally compatible with the present invention. For example and not in limitation, as illustrated in FIG. 1, float 130 can be provided with an overall rectangular or parallelepiped shape. As further illustrated, float 130 can optionally be provided with one or more float apertures or slots 130a to allow the float to be operatively positioned closer to nautical structure 200 while accommodating main guide 110 (and/or any other portion of system 100) for positioning through such a float aperture or slot.

In a further exemplary aspect of the present invention, system 100 can include one or more receivers 140. In one exemplary configuration, a receiver 140 can include a guide aperture 141 and an adjustment aperture 142. Guide aperture 141 can have main guide 110 disposed therethrough, such that receiver 140 is moveably engaged with the main guide; while adjustment aperture 142 can have adjustment guide 120 disposed therethrough, such that the adjustment guide can be moveably engaged with the receiver.

In another exemplary aspect of the present invention, any receiver of the present invention can be formed from any one or more desired materials, such as a metal, alloy, plastic, rubber, or any other naturally-occurring or man-made material(s) that are functionally consistent with the present invention; and further, can be provided with any shape or shapes to the extent desired and functionally compatible with the present invention, including any geometric shape or shapes. Moreover, guide and adjustment apertures 141, 142 can be provided with any shape that is functionally consistent with the present invention. Further, as illustratively shown in FIG. 1, guide and/or adjustment apertures 141, 142 can be shaped complementarily to main guide 110 and/or adjustment guide 120, respectively, to allow moveable engagement therebetween while reducing non-linear movement thereof.

Figure 3:
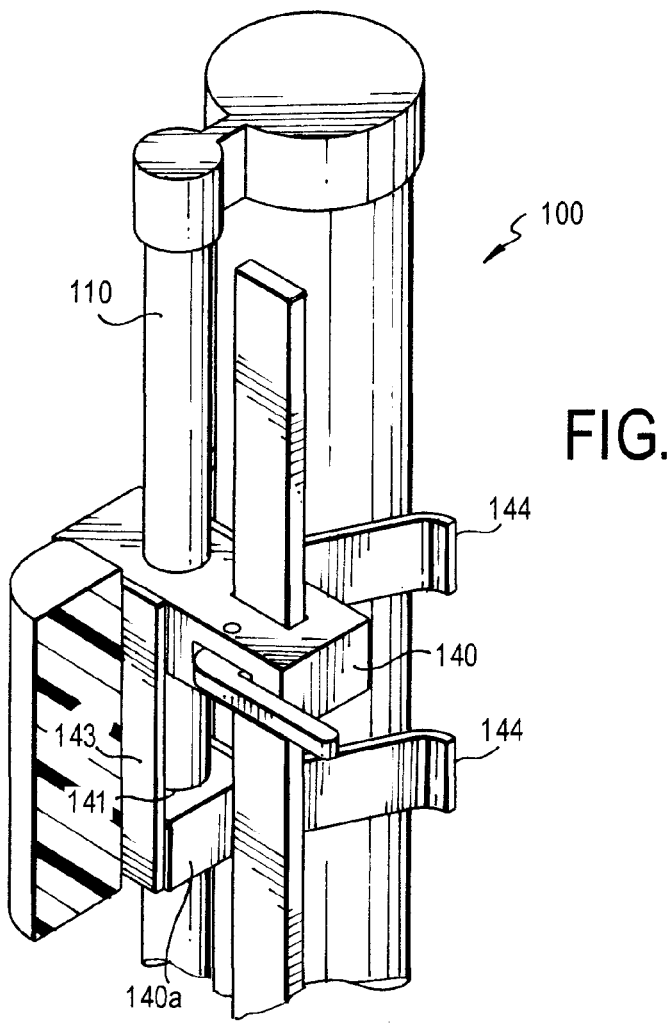
FIG. 3 illustrates an exemplary system having an additional receiver with an exemplary receiver connector.

FIG. 3 illustrates another exemplary configuration of the present invention, in which system 100 can further include at least one additional receiver 140a, which can include a guide aperture 141 and/or an adjustment aperture 142 (not shown), with main guide 110 being disposed through such a guide aperture 141 and/or adjustment guide 120 disposed through such an adjustment aperture 142, respectively. In an exemplary aspect of the present invention, additional receiver (or second receiver) 140a can provide additional overall strength to system 100 and/or facilitate moveable engagement between any receivers and main and/or adjustment guides 110, 120. Notably, FIG. 3 illustrates additional receiver 141a being provided directly below receiver 140; however, the present invention contemplates additional receiver 141a being disposed anywhere along main guide, including but not limited to adjacent to, or integral with, float 130. FIG. 3 further illustrates optional receiver connector 143, which can be attached to, and structurally connect, receiver 140 and additional receiver 140a, so as to allow receivers 140, 140a to move in unison along main guide 110. Optional receiver connector 143 can be provided as any one or more geometric shapes, and with any one or more desired materials, insofar as functionally compatible with the present invention. To the extent a receiver connector 143 is provided, bumper 150 can optionally be connected to the connector to the extent desired.

In still another exemplary aspect of the present invention, system 100 can optionally include at least one of the following lateral maintenance features: a lateral support, a lateral guide, and selectively shaped and/or sized main guide and main guide aperture; to assist in maintaining a desired positioning of bumper 130.

Figure 4:
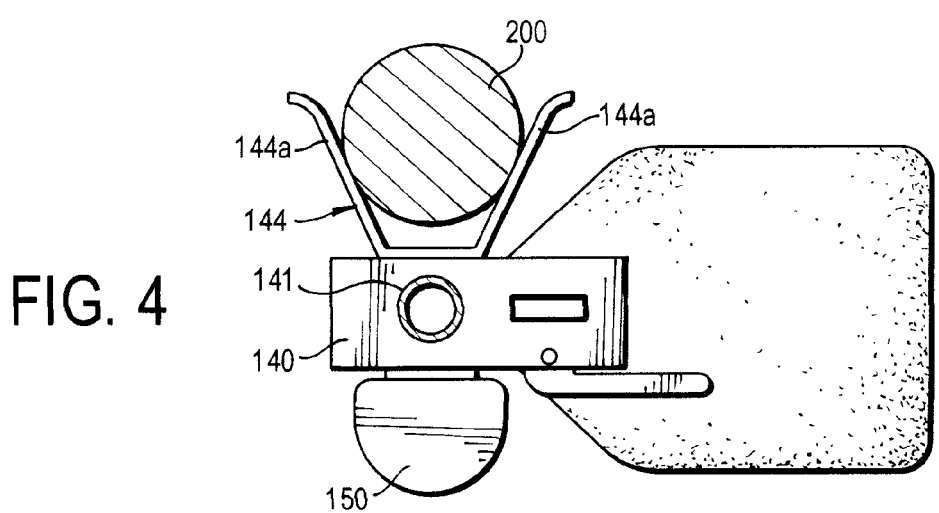
FIG. 4 illustrates, from a top-down perspective, an exemplary system having an exemplary lateral support connected to a receiver.

As illustrated in FIGS. 3 and 4, an optional lateral support 144 can be attached to any one or more receivers, which are illustratively shown as receiver 140 and additional receiver 140a, and further, can be positioned between a receiver 140/140a and nautical structure 200. In an exemplary aspect of the present invention, lateral support 144 can be provided as any desired one or more shapes (i.e., any geometric shape or shapes) and any desired one or more materials (i.e., metal, alloy, plastic, rubber, crystalline, naturally occurring or man-made material) that provide sufficient size and strength to abut nautical structure 200 and to minimize a receiver 140/140a from moving in a lateral direction and/or from rotating around main guide aperture 110, so as to maintain the receiver and bumper 130 in a desired orientation.

For example and not in limitation, as illustratively shown in FIG. 4, in one exemplary embodiment, lateral support 144 can be provided with a pair of arms 144a, which can respectively abut at least one of two portions of nautical structure 200, so as to maintain receiver 140/140a and bumper 130 in a desired orientation. In an exemplary aspect, arms 144a can abut either or both of two laterally-related portions (i.e., not along a vertical axis) of the nautical structure to create a stop or frictional engagement therebetween, which can prevent receiver 140 from moving in a lateral direction and/or from rotating around main guide 110.

As illustrated in FIG. 5, an optional lateral guide 170 can be attached to nautical structure 200 via one or more mounts 210, which as illustrated, can attach to the nautical structure in a horizontal orientation. In an exemplary aspect of the present invention, receiver 140 can further include an optional lateral guide aperture 145, through which lateral guide 170 can be disposed and moveably engaged. Further, optional lateral guide 170 can be oriented in parallel with main guide 110 and disposed through lateral guide aperture 144. Accordingly, receiver 140 can be moveably engaged with main guide 110 and lateral guide 170, which can minimize the receiver from moving in a lateral direction and/or from rotating around main guide 110.

In yet a further exemplary aspect of the present invention, main guide 110 and main guide aperture 141 can be selectively shaped and/or sized to assist in maintaining a desired positioning of bumper 130. For example and not in limitation, along its length that is in moveable engagement with main guide aperture 141, main guide 110 can be provided with any size and/or shape that allows a portion of receiver 140 that defines the main guide aperture to act as an abutment so as to prevent the main guide from rotating within the main guide aperture. Accordingly, main guide 110 and main guide aperture 141 can be provided with any non-circular shape with respective sizes that provide an abutment function when receiver 140 is subject to a rotational force, thus preventing the main guide from rotating within the main guide aperture. For example and not in limitation, main guide 110 and main guide aperture 141 can be respectively provided with a square cross-section and a complementarily-shaped cross section.

In still another exemplary aspect of the present invention, as illustrated in FIG. 1, boat bumper 150 can be attached to receiver 140, so that the bumper moves with the receiver as the receiver moves along main guide 110 and can be positioned to face away from nautical structure 200 so as to ensure a desired positioning of the bumper between the nautical structure and a vessel. Attachment of bumper 150 can be effectuated via any one or more desired structures that are functionally compatible with the present invention, such as one or more of a clamp, bolt, nut, magnet, screw, adhesive, strap, rope, buckle, pin, catch, etc. Further, such attachment can be direct or indirect, in that bumper 150 can directly abut receiver 140 or one or more intermediate structures attached to receiver 140, such as a receiver connector 143 as illustratively shown in FIG. 3, for example and not in limitation. In another exemplary aspect of the present invention, bumper 150 can be provided in any functionally compatible shape or shape, and can be formed from any functionally compatible material or materials desired, that in combination provide a kinetic energy absorbing and/or abrasion minimizing function when between a vessel and nautical structure 200. Accordingly, bumper 150 can be provided in any known or apparent configuration desired insofar as functionally compatible with the present invention.

As illustratively shown in FIGS. 6a-8b, in still another exemplary aspect of the present invention, system 100 further includes an adjustment lock 160 being moveable between an unlocked position, in which the lock does not contact adjustment guide 120, and a locked position, in which the lock contacts the adjustment guide.

Figure 6A:
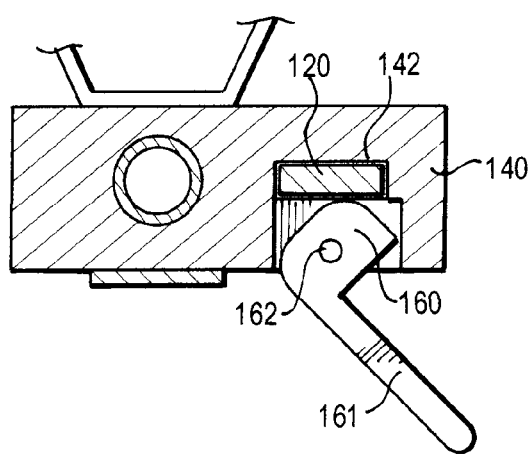
FIG. 6a illustrates an exemplary lock in an unlocked position.
Figure 6B:
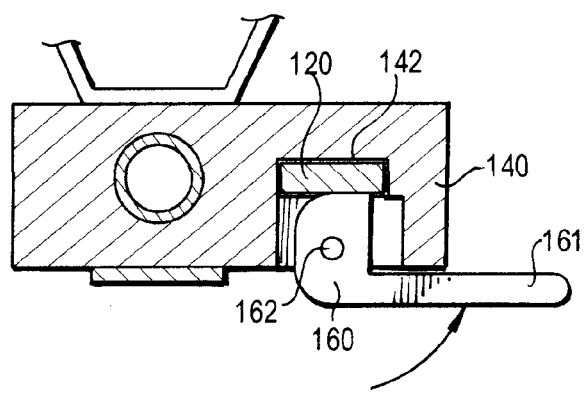
FIG. 6b illustrates an exemplary lock in a lock position.

FIGS. 6a and 6b illustrate an exemplary adjustment lock 160 attached to receiver 140 (via a bolt 162, for example and not in limitation), so as to be adjacent to adjustment guide 120. As further illustrated, lock 160 can include a handle 161 for moving the lock between locked and unlocked positions. FIG. 6a illustrates an exemplary unlocked position, in which adjustment lock 160 does not contact adjustment guide 120, and thus allows receiver 140 (and bumper 150, not shown) to be selectively moved upwardly or downwardly along adjustment guide 120 to a desired position before moving the lock to the locked position. FIG. 6b illustrates an exemplary locked position, in which adjustment lock 160 is moved so as to contact adjustment guide 120 and render the adjustment guide and receiver 140 immovably engaged via static friction.

FIGS. 7a and 7b illustrate an alternative exemplary adjustment lock 160 attached (via a bolt 162, for example and not in limitation) to receiver 140, so as to be adjacent to adjustment guide 120. As further illustrated, lock 160 can include a handle 161 for moving the lock between locked and unlocked positions. FIG. 7a illustrates an exemplary unlocked position, in which adjustment lock 160 does not contact adjustment guide 120, and thus allows receiver 140 (and bumper 150, not shown) to be selectively moved upwardly or downwardly along adjustment guide 120 to a desired position before moving the lock to the locked position. FIG. 7b illustrates an exemplary locked position, in which a portion 163 of adjustment lock 160 can be positioned below at least a part 123 of adjustment guide 120 such that the portion abuts the part, which prevents receiver 140 from moving downwardly along adjustment guide 120 beyond the abutment point; and thus, defines a particular position of receiver 140 (and bumper 150, not shown) relative to the tide level of the body of water 300.

FIG. 8a illustrates yet another exemplary adjustment lock 160 configured as a pin having optional spring-biased locking nubs 164 to maintain engagement of the lock with adjustment guide 120. FIG. 8b illustrates a complementary adjustment guide 120 having a plurality of vertically aligned holes 124 configured for lock 160 to pass therethrough. FIG. 8a further illustrates an exemplary locked position, in which lock 160 can be inserted though a desired hole 124 such that a portion 163 of the adjustment lock can be positioned below at least a part 123 of adjustment guide 120 such that the portion abuts the part, which prevents receiver 140 from moving downwardly along adjustment guide 120 beyond the abutment point; and thus, defines a particular position of receiver 140 and bumper 150 relative to the tide level of the body of water 300. In this exemplary embodiment, withdrawal of lock 160 provides an unlocked position, in which adjustment lock 160 does not contact adjustment guide 120 and thus allows receiver 140 and bumper 150 to be selectively moved upwardly or downwardly along adjustment guide 120 to a desired position before moving the lock to the locked position.

Notably, in any embodiment of the present invention, the various elements and/or aspects can be provided in any desired shape and/or size that are functionally compatible with the present invention as described and/or claimed, and as expressly stated, are not limited to any particular shape or size illustratively described herein or apparent herefrom. Accordingly, exemplary shapes and/or sizes can include any shape or size having one or more geometric shapes, whether having symmetric or asymmetric portions, and without shape or size limitations relative to other elements unless necessary to the functionality of the present invention.

Further, it is expressly set forth that any structural element and/or aspect described herein can be formed from any one or more desired materials that provide functional compatibility with the respective component and/or aspect related thereto. Thus, any one or more of a plastic, rubber, metal, alloy, wood, elastomer, crystalline material, man-made material, naturally-occurring material, synthetic, etc. may be utilized insofar as respectively compatible.

Also notably, to the extent any two elements of the present invention are attached, connected, or fixed to each other or to another structure, any one or more known or apparent attachment, connection, or fixation structures can be utilized to effectuate such attachment, connection, or fixation, including but not limited to, an adhesive, a rope, a strap, a clamp, a nail, a screw, a bolt, a nut, a magnet, etc., and are expressly not limited to any particular attachment, connection, or fixation structure illustrative shown or described.

It will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. An adjustable self-leveling boat bumper system in combination with a nautical structure that extends at least in part over a body of water having a low tide and a high tide, said system comprising:
   a longitudinal main guide fixed to the nautical structure and oriented perpendicular to a surface of the body of water;
   a longitudinal adjustment guide, oriented perpendicular to the surface, and having a first end extending upwardly and a second end attached to a float element;
   at least one receiver including a main guide aperture and an adjustment aperture, the main guide aperture having said main guide disposed therethrough with said at least one receiver being moveably engaged with said main guide, and the adjustment aperture having said adjustment guide disposed therethrough;
   a boat bumper connected to said at least one receiver and positioned to face away from the nautical structure; and
   an adjustment lock, adjacent to said adjustment guide, and being moveable between a locked position, in which at least a portion of said lock contacts said adjustment guide to render said adjustment guide immovably engaged with said at least one receiver, and an unlocked position, in which the portion does not contact said adjustment guide to render said adjustment guide movably engaged with said at least one receiver;
   wherein said at least one receiver is moveable between a low position, in which the boat bumper is at a first bumper position, and a high position, in which the boat bumper is at a second bumper position above the first bumper position, and when floating within the body of water, the float element provides a buoyancy force that maintains the boat bumper in a static position along a range of motion defined by the first and second bumper positions.

2. The system of claim 1, wherein said main guide includes upper and lower portions attached to the nautical structure.

3. The system of claim 1, wherein said lock includes a handle moveable between a first lock position corresponding to the locked position, and a second lock position corresponding to the unlocked position.

4. The system of claim 1, wherein said lock is in the locked position, and the at least a portion contacts the adjustment guide to create static friction therebetween.

5. The system of claim 1, wherein said lock is in the locked position, and the at least a portion is below at least a part of the adjustment guide.

6. The system of claim 5, wherein the at least a portion is a pin.

7. The system of claim 1, wherein the bumper includes a lateral support abutting at least one of a plurality of laterally-related portions of the nautical structure.

8. The system of claim 1, wherein at least a portion of said main guide has a cylindrical shape.

9. The system of claim 8, wherein at least one of said at least one receiver and the bumper includes a lateral support abutting at least one of a plurality of laterally-related portions of the nautical structure.

10. The system of claim 1, wherein at least a portion of said adjustment guide has a parallelepiped shape.

11. The system of claim 1, further comprising a second receiver having a second receiver aperture, the second receiver aperture having said main guide disposed therethrough with said second receiver being moveably engaged with said main guide.

12. The system of claim 11, wherein said second receiver is integral with the float element.

13. The system of claim 11, further comprising a receiver connector attached to said at least one receiver and said second receiver, wherein said boat bumper is attached to said receiver connector.

14. The system of claim 11, wherein said second receiver includes a lateral support abutting at least one of plurality of laterally-related portions of the nautical structure.

15. The system of claim 11, wherein said main guide includes upper and lower portions attached to the nautical structure.

16. The system of claim 11, wherein said lock includes a handle moveable between a first lock position corresponding to the locked position, and a second lock position corresponding to the unlocked position.

17. The system of claim 11, wherein said lock is in the locked position, and the at least a portion contacts the adjustment guide to create static friction therebetween.

18. The system of claim 11, wherein at least a portion of said main guide has a cylindrical shape.

19. The system of claim 11 wherein at least a portion of said adjustment guide has a parallelepiped shape.

20. The system of claim 11, wherein said lock is in the locked position, and the at least a portion is below at least a part of the adjustment guide.

21. The system of claim 20, wherein the at least a portion is a pin.

22. The system of claim 1, further comprising:
   a longitudinal lateral guide fixed to the nautical structure and oriented perpendicular to the surface;
   wherein said at least one receiver further includes a lateral guide aperture, the lateral guide aperture having said lateral guide disposed therethrough with said at least one receiver being moveably engaged with said lateral guide.

* * * * *